US007660857B2

(12) United States Patent
Smith et al.

(10) Patent No.: US 7,660,857 B2
(45) Date of Patent: Feb. 9, 2010

(54) SYSTEMS AND METHODS FOR AUTOMATICALLY UPDATING ELECTRONIC MAIL ACCESS LISTS

(75) Inventors: Steven J. Smith, San Francisco, CA (US); Kenneth A. Schmidt, San Francisco, CA (US)

(73) Assignee: Mindshare Design, Inc., San Francisco, CA (US)

( * ) Notice: Subject to any disclaimer, the term of this patent is extended or adjusted under 35 U.S.C. 154(b) by 1065 days.

(21) Appl. No.: 10/721,044

(22) Filed: Nov. 21, 2003

(65) Prior Publication Data

US 2005/0114516 A1  May 26, 2005

(51) Int. Cl.
*G06F 15/16* (2006.01)
(52) U.S. Cl. ............... 709/206; 709/207; 709/227; 709/228
(58) Field of Classification Search ............... 709/206, 709/207, 227, 228
See application file for complete search history.

(56) References Cited

U.S. PATENT DOCUMENTS

| 4,723,212 | A | 2/1988 | Mindrum et al. |
|---|---|---|---|
| 5,377,354 | A | 12/1994 | Scannell et al. |
| 5,424,724 | A | 6/1995 | Williams et al. |
| 5,487,100 | A | 1/1996 | Kane |
| 5,502,636 | A | 3/1996 | Clarke |
| 5,504,897 | A | 4/1996 | Reilly et al. |
| 5,619,648 | A | 4/1997 | Canale et al. |
| 5,740,549 | A | 4/1998 | Reilly et al. |
| 5,761,662 | A | 6/1998 | Dasan |
| 5,793,497 | A | 8/1998 | Funk |
| 5,793,972 | A | 8/1998 | Shane |
| 5,797,128 | A | 8/1998 | Birnbaum |
| 5,819,261 | A | 10/1998 | Takahashi et al. |
| 5,835,762 | A | 11/1998 | Gans et al. |
| 5,862,325 | A | 1/1999 | Reed et al. |
| 5,864,684 | A | 1/1999 | Nielsen |
| 5,893,099 | A | 4/1999 | Schreiber et al. |
| 5,903,723 | A | 5/1999 | Beck et al. |
| 5,919,247 | A | 7/1999 | van Hoff et al. |
| 5,930,479 | A | 7/1999 | Hall |
| 5,937,162 | A | 8/1999 | Funk et al. |
| 5,944,787 | A | 8/1999 | Zoken |
| 5,948,061 | A | 9/1999 | Merriman et al. |
| 5,970,469 | A | 10/1999 | Scroggie et al. |
| 5,990,886 | A | 11/1999 | Serdy et al. |
| 5,999,932 | A | 12/1999 | Paul |

(Continued)

OTHER PUBLICATIONS

Article—FloNetwork Inc., Prefer Network Team Up, www.emailuniverse.com/list-news/2000/10/18.html, Oct. 18, 2000, 1 page.

(Continued)

*Primary Examiner*—Dohm Chankong
*Assistant Examiner*—Thomas J Dailey
(74) *Attorney, Agent, or Firm*—Fliesler Meyer LLP

(57) ABSTRACT

A system and method for accepting a recipient identifier, wherein the recipient identifier can be used to identify an electronic mail (email) recipient; generating a petition based on the recipient identifier and at least one petition rule, wherein the at least one petition rule includes at least one of: 1) a sender identification method; and 2) a recipient; and wherein the petition can be used by a email provider to allow a recipient to receive email from a sender.

45 Claims, 12 Drawing Sheets

U.S. PATENT DOCUMENTS

| | | | |
|---|---|---|---|
| 5,999,967 | A | 12/1999 | Sundsted |
| 6,014,634 | A | 1/2000 | Scroggie et al. |
| 6,023,723 | A | 2/2000 | McCormick et al. |
| 6,038,668 | A | 3/2000 | Chipman et al. |
| 6,044,205 | A | 3/2000 | Reed et al. |
| 6,044,395 | A | 3/2000 | Costales et al. |
| 6,052,709 | A | 4/2000 | Paul |
| 6,072,942 | A | 6/2000 | Stockwell et al. |
| 6,112,227 | A | 8/2000 | Heiner |
| 6,138,162 | A | 10/2000 | Pistriotto et al. |
| 6,161,130 | A | 12/2000 | Horvitz et al. |
| 6,167,435 | A | 12/2000 | Druckenmiller et al. |
| 6,173,311 | B1 | 1/2001 | Hassett et al. |
| 6,185,541 | B1 | 2/2001 | Scroggie et al. |
| 6,195,698 | B1 | 2/2001 | Lillibridge et al. |
| 6,199,102 | B1 | 3/2001 | Cobb |
| 6,216,127 | B1 | 4/2001 | Gans et al. |
| 6,226,684 | B1 | 5/2001 | Sung et al. |
| 6,249,805 | B1 | 6/2001 | Fleming, III |
| 6,266,692 | B1 | 7/2001 | Greenstein |
| 6,272,536 | B1 | 8/2001 | van Hoff et al. |
| 6,289,372 | B1 | 9/2001 | Vyaznikov |
| 6,341,316 | B1 | 1/2002 | Kloba et al. |
| 6,343,327 | B2 | 1/2002 | Daniels et al. |
| 6,353,852 | B1 | 3/2002 | Nestoriak, III et al. |
| 6,367,075 | B1 | 4/2002 | Kruger et al. |
| 6,377,936 | B1 | 4/2002 | Henrick et al. |
| 6,381,631 | B1 | 4/2002 | van Hoff |
| 6,393,464 | B1 | 5/2002 | Dieterman |
| 6,421,709 | B1 | 7/2002 | McCormick et al. |
| 6,421,717 | B1 | 7/2002 | Kloba et al. |
| 6,430,608 | B1 | 8/2002 | Shaio |
| 6,438,584 | B1 | 8/2002 | Powers |
| 6,449,635 | B1 | 9/2002 | Tilden et al. |
| 6,463,462 | B1 | 10/2002 | Smith et al. |
| 6,546,416 | B1 | 4/2003 | Kirsch |
| 6,553,412 | B1 | 4/2003 | Kloba et al. |
| 6,640,301 | B1 * | 10/2003 | Ng ............................. 713/156 |
| 6,671,715 | B1 | 12/2003 | Langseth et al. |
| 7,039,949 | B2 | 5/2006 | Cartmell et al. |
| 7,072,942 | B1 * | 7/2006 | Maller ........................ 709/206 |
| 7,146,009 | B2 | 12/2006 | Andivahis et al. |
| 7,249,175 | B1 | 7/2007 | Donaldson |
| 2001/0042093 | A1 | 11/2001 | Shirai et al. |
| 2001/0051979 | A1 | 12/2001 | Aufricht et al. |
| 2002/0023135 | A1 | 2/2002 | Shuster |
| 2002/0026484 | A1 | 2/2002 | Smith |
| 2002/0032722 | A1 | 3/2002 | Baynes, Jr. et al. |
| 2002/0035607 | A1 | 3/2002 | Checkoway et al. |
| 2002/0049610 | A1 | 4/2002 | Gropper |
| 2002/0052781 | A1 | 5/2002 | Aufricht et al. |
| 2002/0116463 | A1 | 8/2002 | Hart |
| 2002/0120496 | A1 | 8/2002 | Scroggie et al. |
| 2002/0143879 | A1 | 10/2002 | Sommerer |
| 2002/0152245 | A1 | 10/2002 | McCaskey et al. |
| 2002/0152272 | A1 | 10/2002 | Yairi |
| 2002/0198950 | A1 | 12/2002 | Leeds |
| 2002/0199095 | A1 | 12/2002 | Bandini et al. |
| 2003/0014414 | A1 | 1/2003 | Newman |
| 2003/0028580 | A1 | 2/2003 | Kucherawy |
| 2004/0015554 | A1 * | 1/2004 | Wilson ...................... 709/206 |
| 2004/0034694 | A1 | 2/2004 | Brown et al. |
| 2004/0049696 | A1 | 3/2004 | Baker et al. |
| 2004/0122730 | A1 * | 6/2004 | Tucciarone et al. ........... 705/14 |
| 2004/0153512 | A1 | 8/2004 | Friend |
| 2004/0205124 | A1 | 10/2004 | Limprecht et al. |
| 2004/0205133 | A1 | 10/2004 | Adler |
| 2004/0225572 | A1 | 11/2004 | Tenebaum et al. |
| 2004/0243847 | A1 | 12/2004 | Way |
| 2004/0258044 | A1 | 12/2004 | Girouard et al. |
| 2007/0204043 | A1 * | 8/2007 | Espinosa et al. ............ 709/225 |

OTHER PUBLICATIONS

Press Release—"Responsys.com Introduces Responsys Interact 2.0 for Permission-Based Direction on the Internet," www.responsys.com/corporate/about/details_press.asp?id=10, dated Monday, Oct. 25, 1999, 3 pages.

Press Release—"L-Soft Announces Release of LSMT™ Version 1.1b," www.1soft.com/news/lsmtp, dated Mar. 1, 1999, 2 pages.

Internet Article—"Eight Great Lists Call Topica Home," The Leader in Email Discussions & Publishing Solutions, www.topica.com/about/index.html?mode=eight, dated Jul. 26, 1999, 3 pages.

Chapman, D. B., "Majordomo: How I Manage 17 Mailing Lists Without Answering "request" Mail," 1992 LISA VI, Oct. 19-23, 1992, Long Beach, CA, pp. 135-143.

* cited by examiner

SYSTEMS AND METHODS FOR AUTOMATICALLY UPDATING ELECTRONIC MAIL ACCESS LISTS

CROSS-REFERENCE TO RELATED APPLICATIONS

This application is related to the following co-pending application which is hereby incorporated by reference in its entirety:

SYSTEMS AND METHODS FOR AUTOMATICALLY UPDATING ELECTRONIC MAIL ACCESS LISTS, U.S. application Ser. No. 10/447,593, Inventor: Steven J. Smith, filed on May 29, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to systems and methods for automatically updating electronic mail access lists.

BACKGROUND

Electronic mail (email) addresses are commonly provided by customers when interacting with a company's website. For example, customers often use their email address to serve as their login name, to receive an electronic receipt of a purchase, shipping updates, promotional materials and newsletter subscriptions. As is often the case, however, a customer's email address can fall into the hands of third party organizations that use it to deliver unsolicited email, or "spam".

Internet service providers (ISPs), email service providers (ESPs), and email software companies are employing various strategies to restrict and/or filter incoming email with the aim of reducing the amount of spam received by recipients. A side effect of such strategies is that legitimate email is often discarded, blocked or incorrectly deposited in "bulk mail" folders. As such, some solutions which block and/or filter email enable recipients to specify specific email senders that are allowed to bypass these protections. Such lists of explicitly enabled senders are often called "whitelists". Likewise, it is common to allow recipients to specify "blacklists"—lists of individual senders prohibited from sending email to the recipient. Email coming from blacklisted senders is automatically blocked, filtered, or restricted accordingly.

Manually maintaining whitelists and blacklists can represent a significant inconvenience on the recipient's part. Some systems require the recipient to separately open an application which manages their access lists and manually specify the sender's email address. Another approach requires that the recipient open the application which manages his or her access list and generate a special, unique tracking email address which circumvents the normal challenge/response mechanism. Some so-called "challenge/response" solutions put the burden of maintaining a recipient's whitelist on the senders themselves, by requiring previously unknown senders to authenticate themselves by responding to a "challenge" question designed to be only practically answerable by a human sender. Upon correctly answering the "challenge" question, the sender is deemed to be legitimate (by virtue of being a human sender rather than an automated system), and is added to the recipient's whitelist. However, this process will unwittingly filter out legitimate email that happens to have been sent by a mail program rather than by a person. From either the recipient's or the sender's perspective, a more convenient approach to managing email access lists is desired.

SUMMARY OF THE INVENTION

The present invention is directed towards systems, methods, and computer readable media for modifying mail filters. A petition management service receives a subscription request and generates a petition associated with the user from user information and stores a token on the user's system. When the user logs into a mail provider, the mail provider checks for the presence of the token. Upon detecting the token, the mail provider processes the petition.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Figure 1:
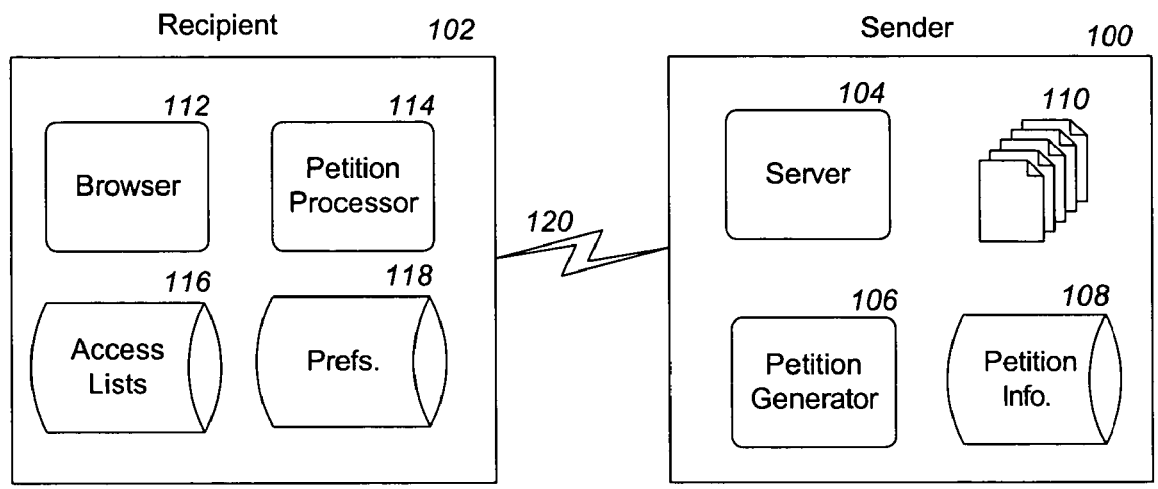
FIG. 1 is a system diagram illustrating one embodiment.

FIG. 1 is a block diagram illustrating an embodiment of the present invention. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIG. 1., sender 100 includes server 104, access list petition generator 106 and petition information 108. By way of a non-limiting example, petition information (and any other information) can be stored and accessed through a number of means including but not limited to relational databases, digital files, random access memory, read-only memory, caches, and look-up tables. By way of a non-limiting example, the server can be a web server and/or application server. The server can accept HTTP (Hypertext Transfer Protocol) requests from various recipients and can provide Web pages 110 (e.g., files containing Hypertext Markup Language and possibly other information) in response. The petition generator can create an access list petition request (or "petition") and provide it to a recipient. In one embodiment, a petition can be used by the recipient for, among other things, to add the sender to the recipient's whitelist. The petition generator can utilize data from the petition information, the server, web pages and/or other sources to create a petition. In one embodiment, petition information can include descriptive information about the sender including identification information. Although the present disclosure is not limited by or restricted to any particular implementation, in one embodiment the petition generator logic can be incorporated partially or entirely into the server or into a web page (e.g., via JavaServer Pages™, available from Sun Microsystems, Inc. of Mountain View, Calif.).

Recipient 102 can include Web browser 112, petition processor 114, access list information 116, and user preferences information 118. The browser can display web pages provided by the server. In one embodiment, the browser is Microsoft Internet Explorer, available from Microsoft Corp. of Redmond, Wash. The petition processor processes petitions produced by the petition generator. In one embodiment, a petition is provided to the web browser, which then provides it to the petition processor. In processing the petition, the petition processor can utilize the access list, user preferences information and other information pertaining to security settings/polices for an email client or email provider. The access list information can include one or more whitelists and/or one or more blacklists. User preferences can include security polices and run-time settings that dictate how the petition processor operates. In one embodiment, the petition processor can be incorporated partially or entirely into an email client program (not shown) such as Microsoft Outlook™, available from Microsoft Corp. of Redmond, Wash. In another embodiment, the petition processor can be incorporated into a challenge/response mechanism (not shown) such as "Mailblocks", available from Mailblocks, Inc. of Los Altos, Calif. It is important to note, however, that the present disclosure is not limited to any particular email client program, challenge/response mechanism, or any other type of mail program and/or spam filter. Furthermore, the present disclosure is not limited to any particular email protocol or email address format.

The recipient and the sender may reside on the same computing device or on different computing devices. By way of a non-limiting example, a computing device can include a personal computer, portable computer, personal digital assistant, mobile phone, wearable digital device, wrist watch, digital music player and a mainframe computer. Recipients, senders and other systems (as will be illustrated in subsequent diagrams) can communicate over communication link 120. In one embodiment the communication link may include one or more networks (e.g., the Internet, Wide Area Network, Local Area Network, wireless network, satellite, and other suitable networks). In another embodiment, the communication link can be realized as shared memory (e.g., random access memory and/or read-only memory), a shared object/data structure, a file system, a distributed object (e.g., a JavaBean, CORBA object, .Net Object, and a Web service), and/or an inter-processor data conduit in a multi-processor (e.g., parallel) computer. In another embodiment, the communication link can be based on any combination of the above embodiments. Although this disclosure is not limited by or restricted to using a particular communication protocol, one embodiment allows the recipient and the sender to communicate using HTTP over the Internet.

Figure 2:
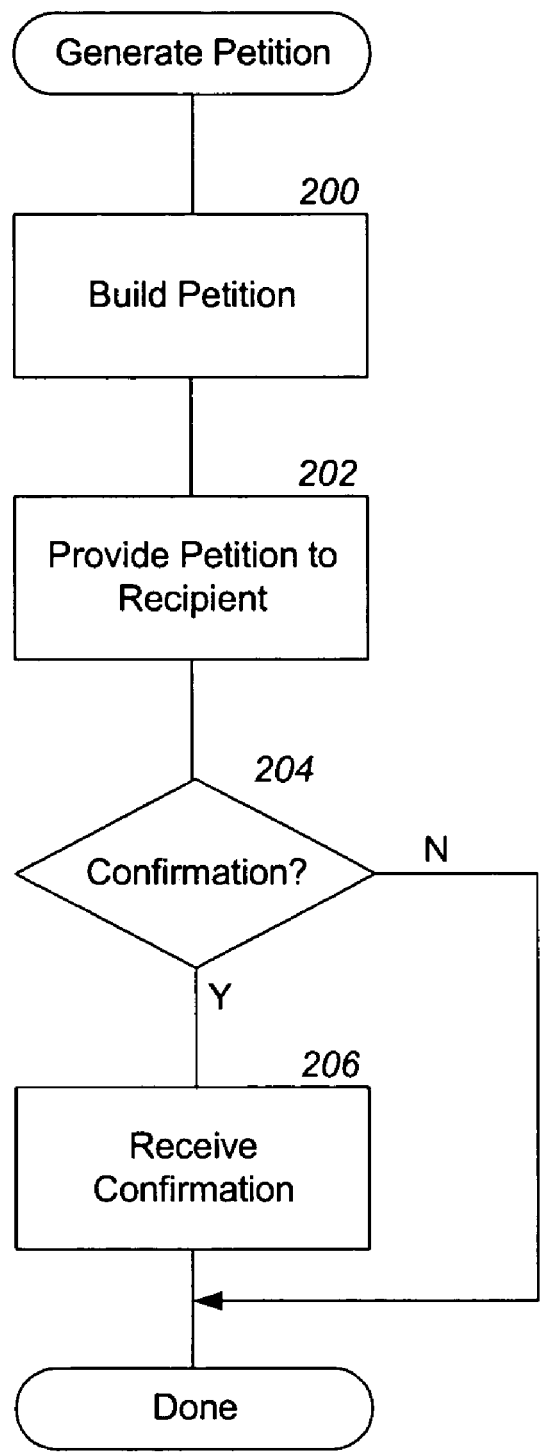
FIG. 2 is a flow chart illustrating petition generation in one embodiment.

FIG. 2 is a flow chart illustrating petition generation in one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

A sender can utilize a petition generator to create a petition that will (potentially) allow the sender to add itself to a recipient's whitelist. In one embodiment, this can happen as a result of receiving the recipient's email address. By way of a non-limiting example, the recipient's email address can be obtained by the sender in conjunction with a Web-based purchase (i.e., a purchased transacted over the World Wide Web), a newsletter subscription, etc. In Step 200, the petition generator uses the recipient's email address in concert with data drawn from the petition information to produce a petition. Petition information can include the sender's descriptive information (e.g., name, description, address, etc.), identification methods and confirmation information. These will be discussed below. The petition information can also keep track of whether or not a particular recipient has added the sender to their whitelist (e.g., whether or not a petition was accepted by a given recipient). In such a case, the sender need not generate a petition.

For discussion purposes, a petition will be illustrated as plain text. However, the present disclosure is not limited by or restricted to any particular representation. Suitable representations include but are not limited to, plain text, XML (extensible Markup Language), binary data, encrypted data, URL-encoded data as part of a URL (Uniform Resource Locator), name-value pairs transmitted as part of an HTTP "POST" method request, and/or any combination of these. In one embodiment, a petition can include lines of text wherein each line includes an element name and one or more associated values. The format of petition data is flexible and extensible. Minimally, it can consist of a recipient identifier (e.g., the recipient's email address), the sender's name, and the sender's identification method and/or credentials. By way of a non-limiting example, such a petition might appear as follows (wherein colons separate elements from corresponding values):

Recipient: steve@xyzcompany.com
Sender: City Tribune Newspaper
Identification: from-address newsletter@citytribunepaper.com In this example, the recipient element has email address "steve@xyzcompany.com" as its value. This element specifies the email address that the sender is petitioning for permission to use. The sender element identifiers the sender as "City Tribune Newspaper". In one embodiment, a petition can contain a plurality of sender elements. By way of a non-limiting example, such a situation may arise if a sender is petitioning for inclusion on the recipient's whitelist on behalf of itself and other senders.

A recipient may require that a sender support one or more sender identification methods which are used by the recipient to verify that an email message is from the given sender. Senders tell the recipient which methods they support through the identification element. In the above example, the identification method is "from-address". That is, email from City Tribune Newspaper is verified when the email header "From" address equals "newsletter@citytribunepaper.com". This is a simple but potentially inadequate method for identifying senders since the "From" address is easily forged. But the present invention is not limited by or restricted to any particular identification method. As new and improved identification methods are developed, they can be included in the petition without impairing the operation of existing verification methods.

By way of a non-limiting example, consider the following petition:

```
Recipient: steve@xyzcompany.com
Sender: City Tribune Newspaper
Identification: from-address newsletter@citytribunepaper.com
Identification: header-password 294305828
Identification: IP-address 192.168.5.0 255.255.255.0
Identification: public-key F349SBF28ZKFWO
```

In this example, the sender has specified four identification methods. The first method ("from-address") was discussed above. The "header-password" method specifies a password ("294305828") that the sender will include with the header portion of an email message sent to the recipient. In one embodiment, the password can be assigned to the sender by the recipient and provided to the recipient via a confirmation (see below). Another way to identify a sender is by its Internet Protocol (IP) address. The "IP-address" identification method allows a sender to specify an IP address and subnet mask address which identifies a range of source IP addresses from which it will send mail to the recipient. A more secure identification method than those already discussed is the use of public-key encryption technology to digitally "sign" an email message. The "public-key" identification method allows a sender to specify a public key ("F349SBF28ZKFWO") which can be used by the recipient to decrypt a digital signature accompanying the sender's email. By way of a non-limiting example, if the value of the decrypted signature equals the value of the email header produced by a message digest algorithm, the sender's identity is verified.

Additional petition elements are possible since the format of a petition is flexible and naturally extensible. Such elements can include sender contact information (e.g., postal address, telephone number, Web page address, etc.), the sender's business category (e.g., retail, non-profit organization, entertainment, etc.), the nature of the sender's email (e.g., newsletter, promotions, transaction receipts, shipping updates, etc.), a description of the sender, and instructions to the recipient regarding confirmation of the outcome of the petition. By way of a non-limiting example, consider the following petition:

```
Recipient: steve@xyzcompany.com
Sender: City Tribune Newspaper
Identification: from-address newsletter@citytribunepaper.com
Identification: header-password 294305828
Identification: IP-address 192.168.5.0 255.255.255.0
Identification: public-key F349SDF28ZKFWO==
Description: Daily email version of the City Tribune newspaper
Sender-category: Media
Sender-email-category: newsletter
Petition-success: URL http://wwwwwww
Petition-denied: URL http://xxxxxxx
Petition-success: URL http://yyyyyy
Petition-denied: URL http://zzzzzz
```

In this example, the sender has included a description of itself in the petition ("Daily email version of the City Tribune newspaper"). The sender has also specified that its business category is "Media" and that the nature of its email to the sender is "newsletter". In one embodiment, if a recipient accepts a sender's identification method(s), then the recipient implicitly trusts that the sender is not misusing the Sender-category and Sender-email-category elements in order to increase the likelihood that the sender will be added to the recipient's email access list. The petition may also optionally include instructions for the petition processor to communicate a confirmation of the outcome of the petition (e.g., whether the sender was added to the recipient's whitelist or not) back to the petition generator so that the recipient's email address may be appropriately dealt with by the sender. A sender, by way of a non-limiting example, may wish to disallow finalization of registration on its website in cases where the recipient does not accept the sender's petition. The instructions for confirmation can include the method for confirmation of the outcome and details of how to execute the confirmation. The petition format is extensible such that new methods may be used as they are made available. In addition, the petition format also allows multiple confirmation methods to be specified for the same sender, allowing for backward-compatibility as new confirmations methods are deployed.

In one embodiment, a confirmation method allows the recipient to access a URL (Uniform Resource Locator) on the sender's server which has been pre-configured by the sender to affect the desired action for the given result. In the example above, the sender has specified two pairs of confirmation methods:

```
Petition-success: URL http://wwwwwww
Petition-denied: URL http://xxxxxxx
Petition-success: URL http://yyyyyy
Petition-denied: URL http://zzzzzz
```

Each pair specifies a URL for the recipient to access upon acceptance of the petition ("Petition-success") and rejection of the petition ("Petition-denied"). In the case where the petition is accepted, the recipient will access URLs http://wwwwwww" and "http://yyyyyy". In the case where the petition is rejected, the recipient will access URLs "http://xxxxxxx" and "http://zzzzzz".

The petition processor may be configured to not honor some or all requests for confirmation, based on user preferences, security policies determined by an email client provider or an email service provider, or due to programming simplifications in the design of the petition processor.

The present disclosure is not limited by or restricted to any particular confirmation method. As new confirmation techniques are developed, they can be integrated into petitions using the Petition-success and Petition-denied elements while maintaining backwards compatibility with existing confirmation methods.

Referring again to FIG. 2., in Step 202 the petition generator automatically provides the petition to the recipient. In one embodiment, the petition generator provides the petition to the server. The server tags the petition data with a specially designated MIME (Multi-purpose Internet Mail Extension) type and sends it to the recipient web browser via the HTTP protocol. The browser can be configured to associate the specially designated MIME type with the petition processor. This association can be configured upon installation of the petition processor so as to not require additional manual configuration by the recipient. Upon receipt of a petition, the web browser automatically provides it to the petition processor. The web browser can also automatically launch the petition processor if it is not already running. In another embodiment, the petition processor can be configured as a web browser "plug-in".

In another embodiment, the petition can be associated with an object, such as an image in the web page provided to the browser by the server. The web page can include JavaScript (or other code) which, when executed by the browser, can determine if the recipient's browser supports the specially-designated MIME type. If not, the JavaScript can prevent the image from being rendered. Otherwise, the image can be rendered and the petition data associated with it provided to the petition processor. In another embodiment, the petition can be requested as a result of a redirection of an initial confirmation page to a new URL. One method of accomplishing such a redirection is by using the "meta" HTML tag:

```
<meta HTTP-EQUIV="refresh"
   CONTENT="5;URL=http://www.sendersite.com/cgi-bin/petreq.pl">
```

In a further embodiment, the petition may be sent as an additional URL specified in a separate frame in an HTML page, or in a separate window.

Step 204 determines whether the sender will receive confirmation of the petition from the recipient. If the petition generator did not include conformation instructions (see Step 200) in the petition, the process concludes. Otherwise, confirmation of the success or denial of the petition by the recipient can be automatically provided to the sender in Step 206 if the petition processor chooses to do so. In one embodiment, if confirmation was requested by the sender but never received, the sender can assume that the petition was denied by the recipient.

Figure 3:
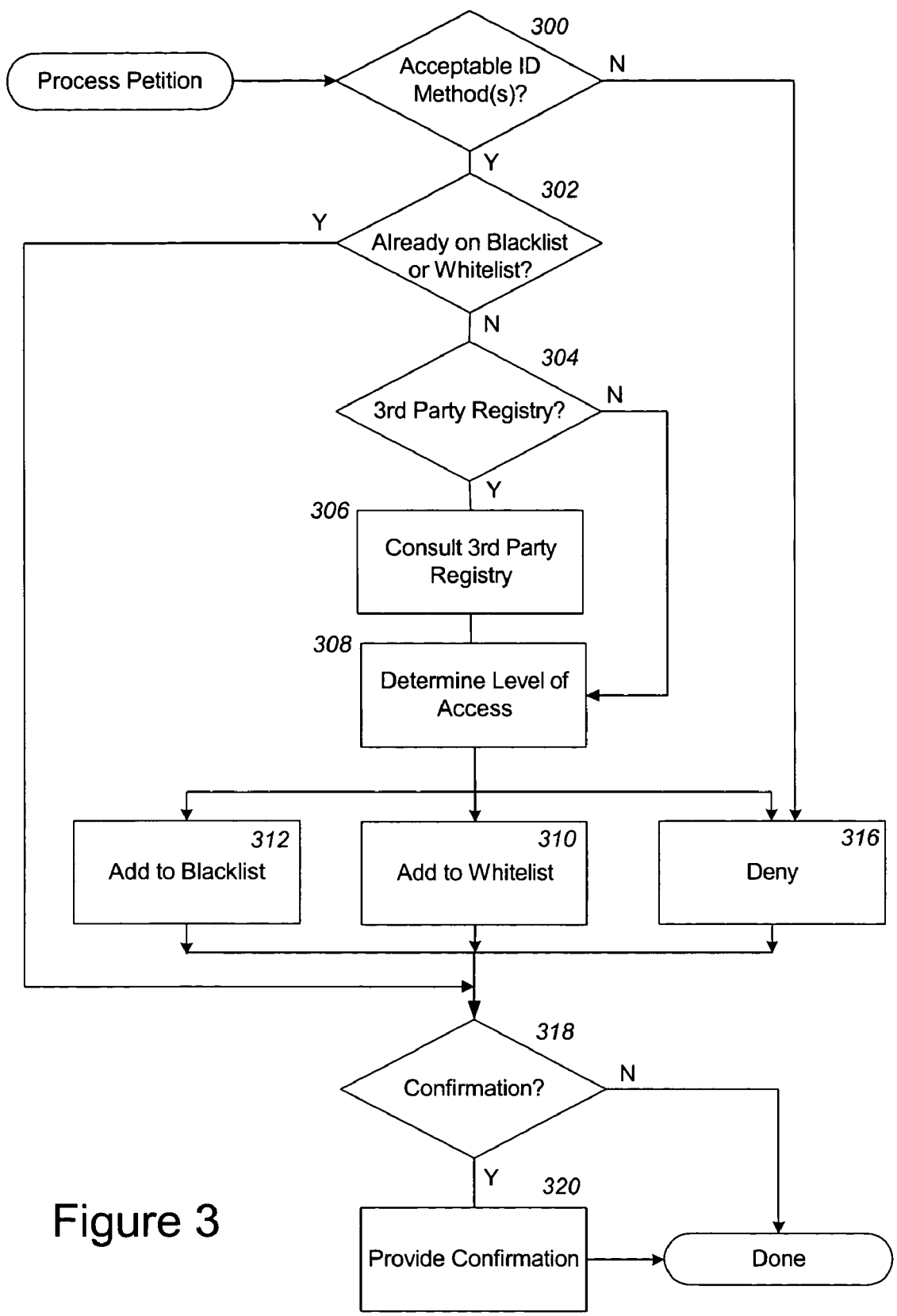
FIG. 3 is a flow chart illustrating petition processing in one embodiment.

FIG. 3 is a flow chart illustrating petition processing in one embodiment. Although this figure depicts functional steps in a particular order for purposes of illustration, the process is not limited to any particular order or arrangement of steps. One skilled in the art will appreciate that the various steps portrayed in the figure could be omitted, rearranged and/or adapted in various ways.

In Step 300, a determination is made as to whether there are acceptable identification method(s) in the petition. The user preferences information can specify the identification method(s) that are required of potential senders. In one embodiment, the required identification method(s) can be articulated as an expression that is evaluated dynamically against elements and values in the petition. By way of a non-limiting example:

```
(from-address AND header-password AND IP-address) OR (from-
    address AND public-key).
```

The identification method expression above declares that a petition must support either from-address, header-password, and IP-address, or from-address and public-key identification methods. This feature allows a flexible approach to identity verification. In another embodiment, the user preferences information can include rules that can be used to dynamically determine the identification methods required based on information in the petition. In one embodiment, rules can be specified in a natural language.

If the petition does not support the required identification method(s), the petition is denied in Step 316. Next, in Step 318 it is determined whether or not the sender requires a confirmation. If confirmation is required, it is provided in Step 320. Otherwise, processing concludes.

In Step 302, a determination is made regarding whether or not the sender (as identified by an acceptable identification method) is already on an email access list. If this is the case, no action will be taken. Processing continues at Step 318 which determines whether or not the sender requires confirmation. If confirmation is required, it is provided in Step 320 according to the instructions in the petition.

In one embodiment, if the sender is not currently on an access list, the recipient end-user can be prompted for input regarding whether to grant access to the sender based upon the petition. In one embodiment, the prompt can allow the end-user to choose whether to add the sender to a whitelist, a blacklist or to simply deny the petition. In another embodiment, the prompt can allow the user to discover if the sender is listed in a third party registry of trusted senders. User preferences and/or security policies determined by the email client vendor or email service provider can specify whether the end-user should always be prompted, never be promoted, or only prompted sometimes (based on rules that are dynamically evaluated against information in the petition). In one embodiment, rules can be specified in a natural language. By way of a non-limiting example, consider the following rule:

```
if (Sender not equal "Amazon.com" OR
    Identification = from-address) then
    prompt user.
```

This rule states that if the Sender is not Amazon.com or the sender's identification method is only "from-address", then the recipient end-user will be prompted as to what action to take.

If the sender is not already on an access list, processing continues at Step 304. Step 304 determines based on user preferences whether or not to consult one or more third-party registries of trusted senders. In one embodiment, a third party registry can be provided by TRUSTe of San Francisco, Calif. This information may either be provided to the recipient end-user for consideration when determining whether to grant access, or used by the petition processor directly to automatically make access granting decisions without recipient consultation. In one embodiment, this behavior can be configured as a user preference. User preferences and/or security policies determined by the email client vendor or email service provider can specify whether third-party registries should always, never or sometimes be consulted (based on rules that are dynamically evaluated against information in the petition). In one embodiment, rules can be specified in a natural language. By way of a non-limiting example, consider the following rule:

```
if (Identification = public-key) AND
    (Sender in registry("TRUSTe")) then
    add sender to whitelist.
else
    Prompt_user;
```

This rule states that if the sender is identified with a public key and the sender is contained in the "TRUSTe" third party registry, the sender can be added to the whitelist without prompting, otherwise the recipient should be prompted to make the determination of how the sender should be handled. If such registries are to be consulted, this can take place in Step 306. Otherwise, processing continues at Step 308.

Step 308 determines the level of access that will be provided to the sender based on the information in the petition, any end-user input, and any input from third party registries. If in response to a prompt, the end-user specified that the sender should be included on the whitelist, such is accomplished in Step 310. If in response to a prompt, the end-user specified that the sender should be included on the blacklist, such is accomplished in Step 312. If in response to a prompt, the end-user specified that the petition should simply be denied, this is accomplished in Step 316. If there was no end-user input, rules in the user preferences information can be consulted regarding what action to take. These so-called action rules can be dynamically evaluated against the results of consulting third-party registries and the information contained in the petition. In one embodiment, rules can be specified in natural language. By way of a non-limiting example, consider the following four rules:

```
(1) If    (Sender-category = pornography)
          then add sender to blacklist.
(2) If    (Sender identification method = public-key) and Sender
          in third-party registry, then add Sender to
          whitelist.
(3) If    (Sender in third-party known spammer list)
          then add sender to blacklist.
(4) Default: Prompt_user;
```

In the above example, rule (1) specifies that if the sender category is pornography, automatically add the sender to the blacklist regardless of any other information in the petition. Rule (2) specifies that if the sender is identified by public-key encryption and is in a third-party registry of trusted senders, add the sender to the whitelist. Rule (3) specifies that if the sender is in a third-party list of known spammers, add the sender to the black list. Finally, a default rule (4) specifies that if no other rule applies, prompt the user to determine how to handle the petition.

Processing continues at Step 318 which determines whether or not the sender requires confirmation. If confirmation is required and the petition processor chooses to allow it, it is provided in Step 320 according to the instructions in the petition.

Web-based email providers, such as Hotmail (http://www.hotmail.com) or Yahoo (http://www.yahoo.com) introduce an environment where a recipient's access lists are located on the remote systems of the web mail provider rather than on the recipient. As such, a petition processor on the recipient will need to read and modify access information on the mail provider. This situation is addressed by the system of FIG. 4.

Figure 4:
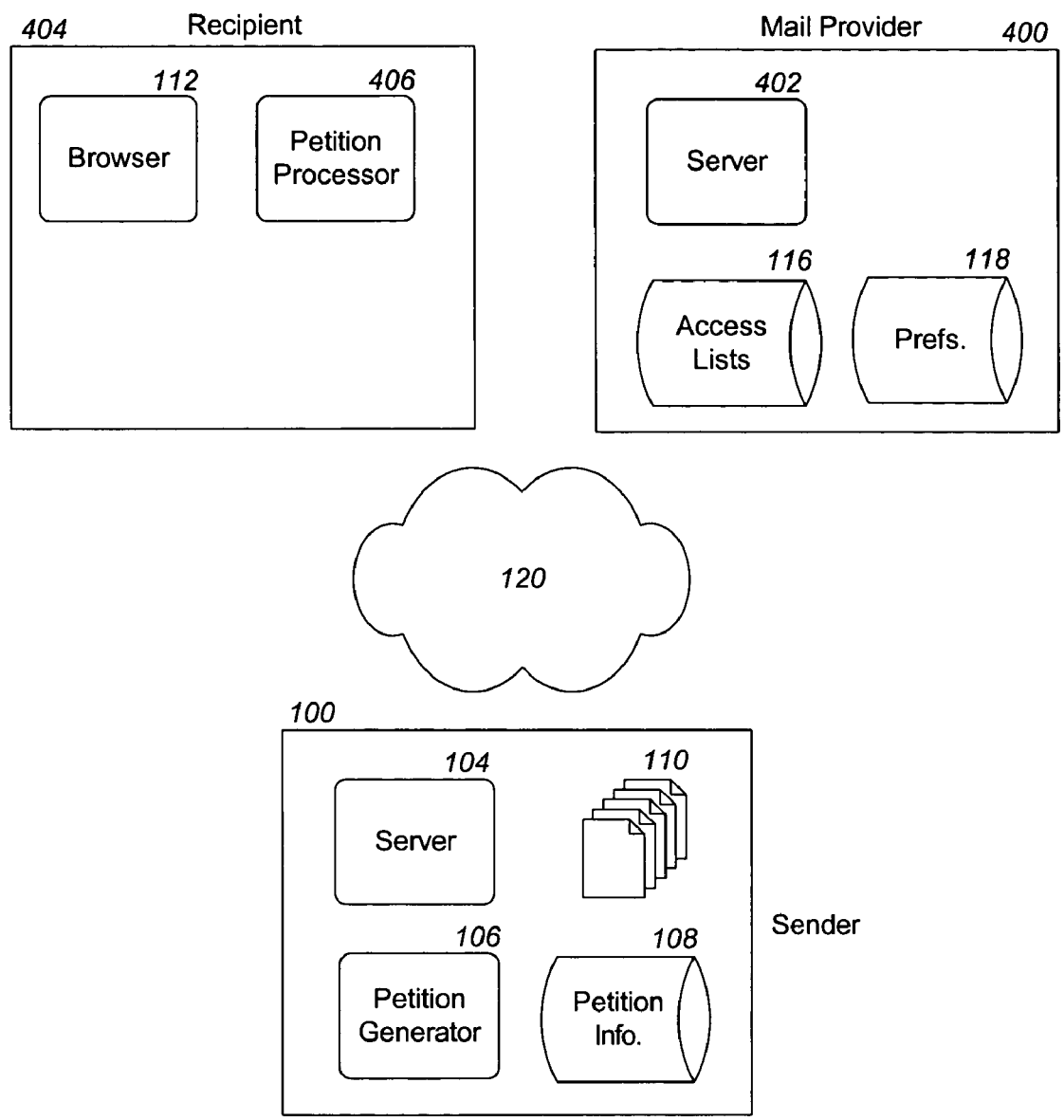
FIG. 4 is a system diagram of an embodiment including a remote mail provider.

FIG. 4 is system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 4, sender 100 includes server 104, petition generator 106, petition information 108 and web pages 110. Mail provider 400 includes server 402, access list information 116, and user preferences information 118. By way of a non-limiting example, the mail provider can support one or more of the following email protocols: SMTP, MIME, POP and IMAP. Recipient 404 includes web browser 112 and petition processor 406. A request to add the sender to the mail provider's email access list begins with the recipient's email address being provided to the sender. Based on this email address and the petition information, the petition generator produces a petition which is automatically provided to the recipient's petition processor. In order to process the petition, the petition process needs to read and update the access lists and user preferences information. However, unlike the system of FIG. 1, this information is no longer local to the recipient. In one embodiment, a simple request/reply protocol can used to exchange this information between the petition processor and the mail provider. By way of a non-limiting example, the petition processor can send requests to the mail provider that identify a data source (e.g., whitelist, blacklist, user preferences, etc.) and an operation to take on that data source (e.g., read, update, delete, etc.). The mail provider can respond with the appropriate data and/or a confirmation of the operation.

Figure 5:
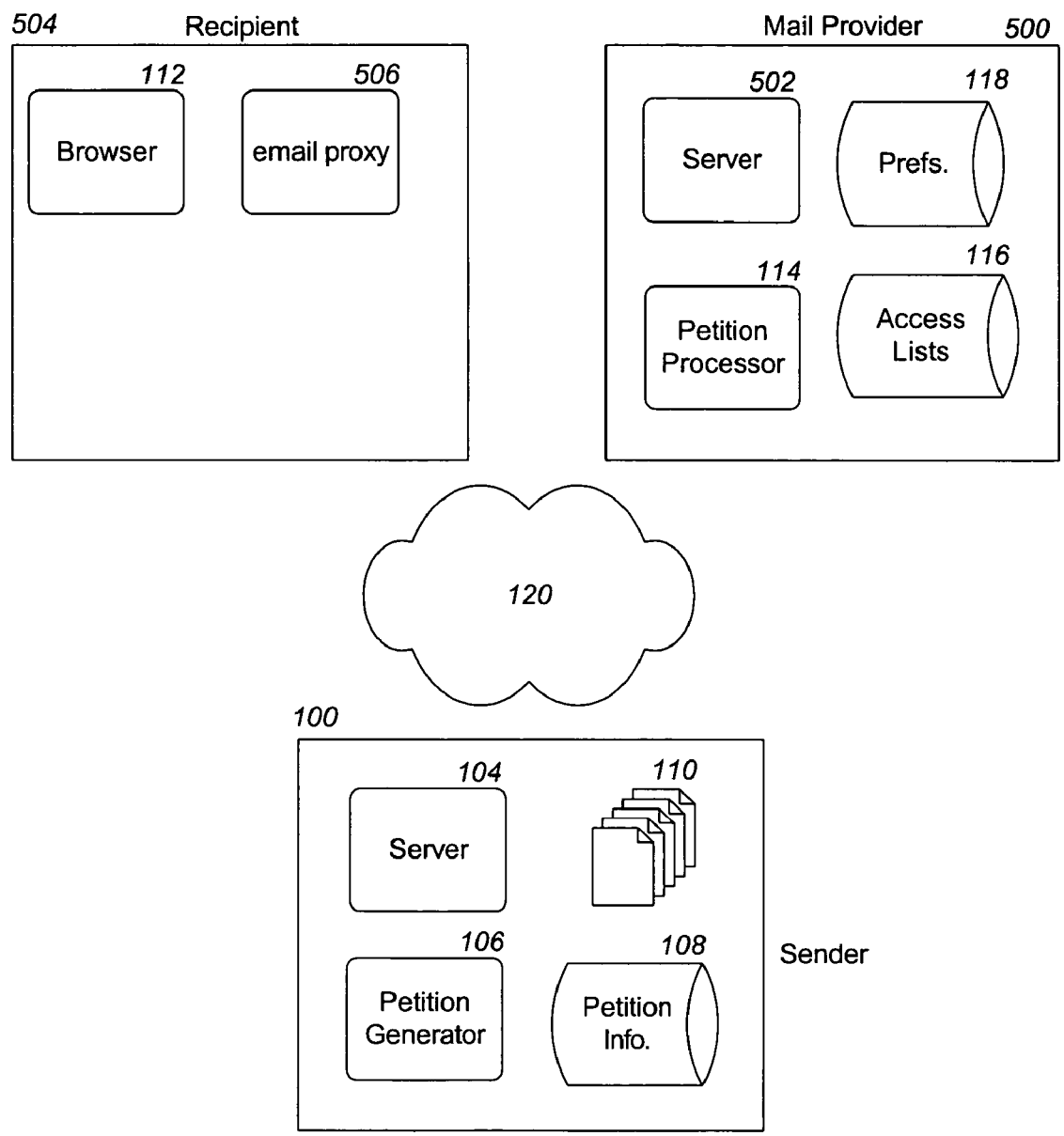
FIG. 5 is a system diagram of an embodiment including a remote mail provider.

However, if the petition processor is also located on the mail provider, a different approach can be taken. FIG. 5 is system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 5, sender 100 includes Web/application server 104, petition generator 106, petition information 108 and web pages 110. Mail provider 500 includes server 502, petition processor 114, access lists 116, and user preferences information 118. Recipient 504 includes Web browser 112 and email proxy 506. The proxy is associated with the petition MIME type such that when a petition is received by the browser, the browser automatically provides it to the proxy. The proxy then automatically forwards the petition to the mail provider petition processor. Unauthorized access to the petition processor can be prevented by requiring authorization credentials in addition to a petition. The proxy can provide such credentials to the petition processor. In one embodiment, authorization credentials can be installed as part of the proxy's configuration. In one embodiment, Yahoo! Default Email Application, available from Yahoo (http://www.yahoo.com), can serve as the proxy. The petition processor can use the web browser as its GUI for recipient end-user interaction (e.g., prompts). Petition confirmations need not communicate with the recipient, and may be made directly from the petition processor on the mail provider to the petition generator on the sender.

Figure 6:
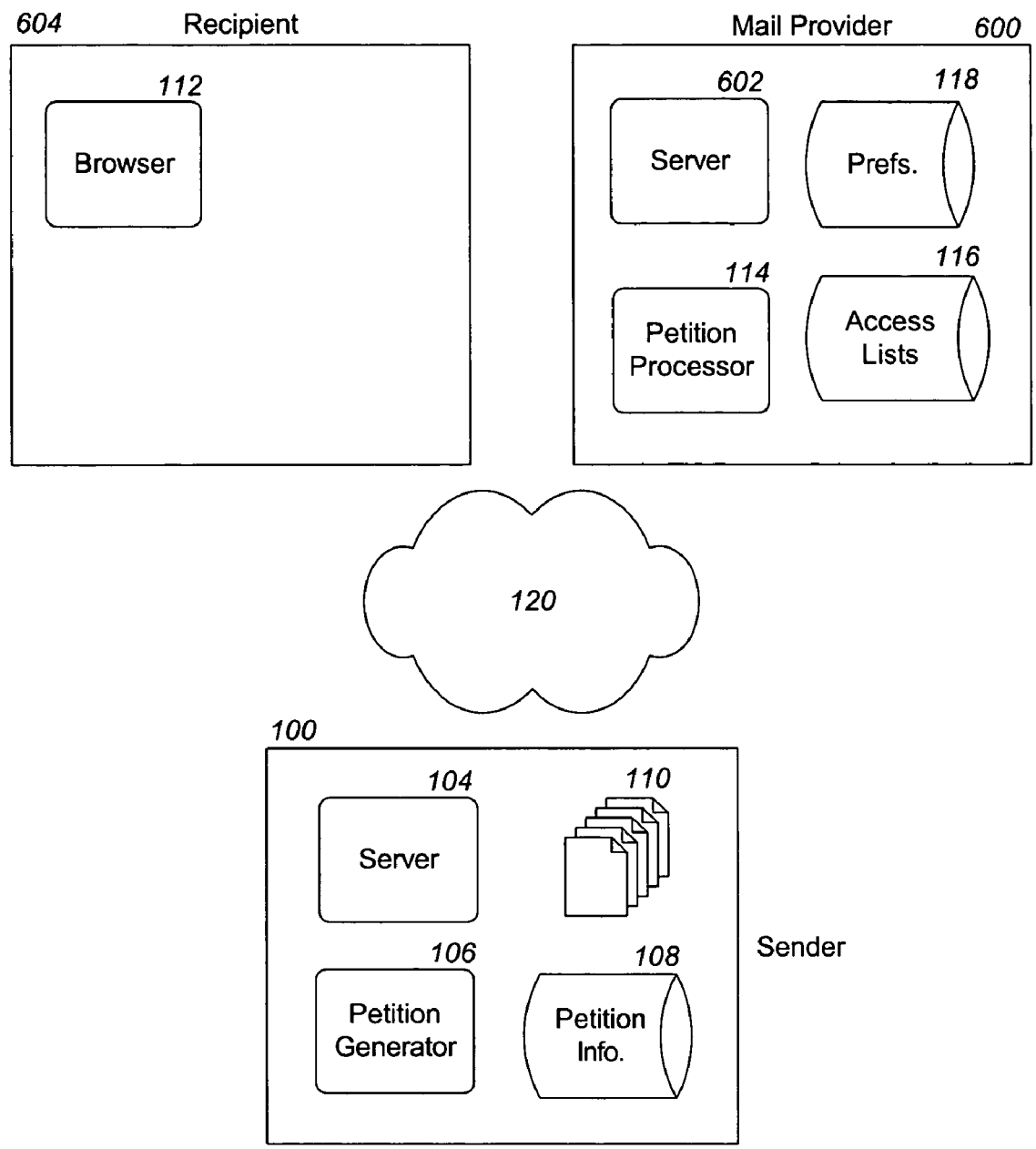
FIG. 6 is a system diagram of an embodiment including a remote mail provider.

FIG. 6 is another system diagram of an embodiment including a remote mail provider. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIGS. 1 and 6, sender 100 includes Web/application server 104, petition generator 106, petition information 108 and web pages 110. Mail provider 600 includes server 602, petition processor 114, access lists 116, and user preferences information 118. Recipient 604 includes Web browser 112. The petition processor is invoked in one embodiment via the recipient's web browser when it accesses a special URL on the mail provider's server, where part of the URL can be the Internet location of the petition processor, and part of the URL can be an encoded version of the petition. The part of the URL containing the Internet location of the petition processor can be stored in a variable or object accessible with JavaScript or another web page scripting language, and the part of the URL containing the encoded petition data can be generated by the petition generator as part of an HTML confirmation page (e.g., as provided by the sender's server to the recipient's browser). Additionally, the browser can be configured with authorization credentials for invoking the petition processor, and can pass these credentials to the petition processor when the petition processor is invoked. This can be accomplished in a number of ways, including but not limited to, by incorporating the credentials as part of the URL of the petition processor, by the passing of a cookie or token previously stored by the mail provider containing the authorization credentials, or other suitable means. The HTML confirmation page can also contain JavaScript or another suitable web page scripting language to check for the presence of such a petition processor URL, and if it exists, add the encoded petition data, and cause the browser to access the petition processor URL. Such an access can take place in a variety of ways, including but not limited to, in a separate frame, in a separate window, or as a redirection of the existing window.

Figure 7:
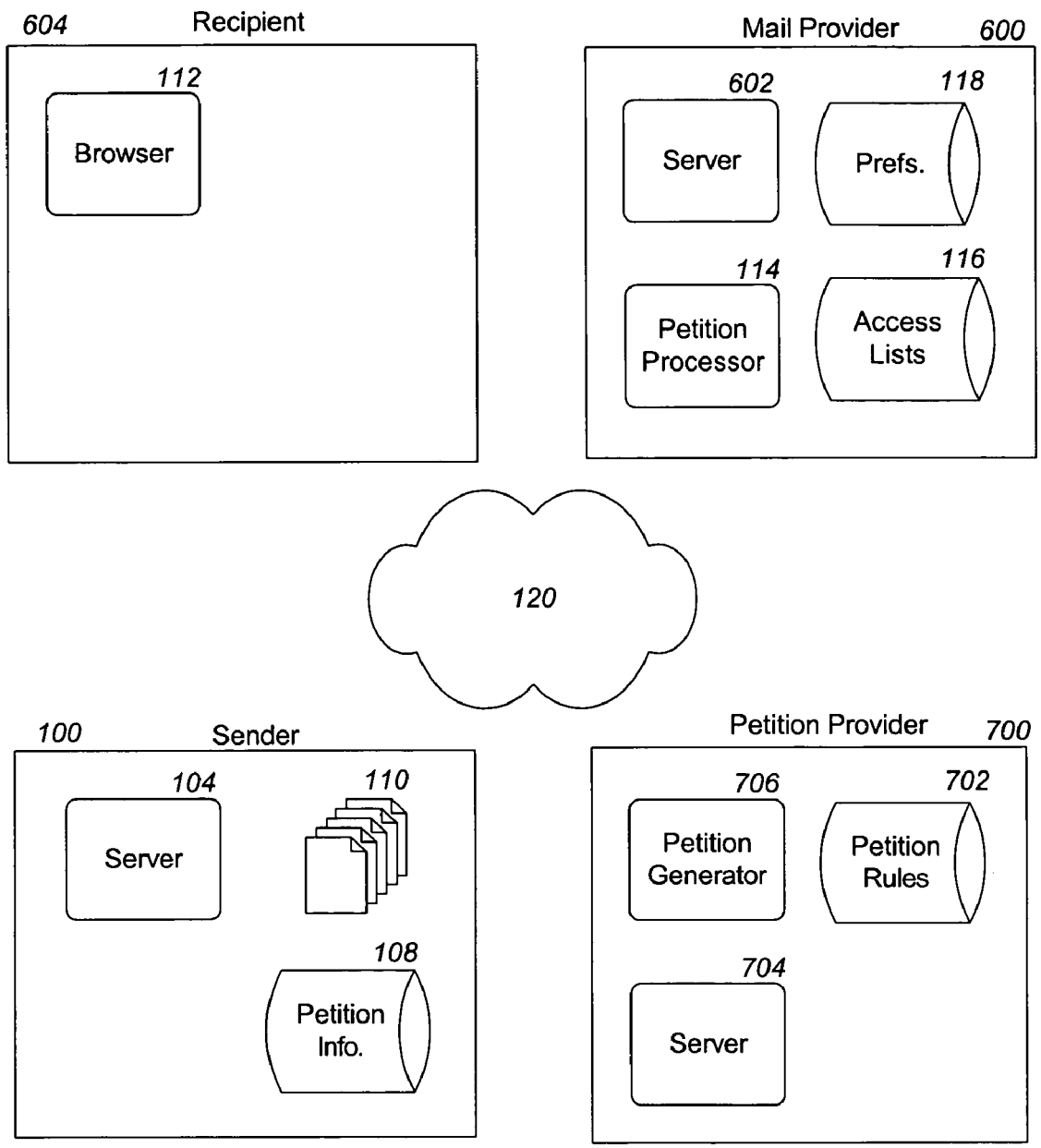
FIG. 7 is a system diagram of an embodiment including a petition provider and petition generation rules.

FIG. 7 is system diagram of an embodiment including a petition provider and petition generation rules. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

Referring to FIG. 7, sender 100 includes Web/application server 104, petition information 108 and web pages 110. Mail provider 600 includes server 602, petition processor 114, access lists 116, and user preferences information 118. Recipient 604 includes Web browser 112. Petition provider 700 comprises petition generator 706, petition rules list 702, and Web/application server 704. In this embodiment, the sender's web server provides the recipient's browser an HTML document that contains code to cause the recipient's browser to access a URL on the petition provider's server. Non-limiting examples of such code include an HTTP redirect browser instruction, a META HTML tag which triggers redirection, JavaScript code to redirect the browser window or open a new browser window, ActiveX® controls, addition frames within an HTML frameset, or other suitable means. ActiveX controls are available from Microsoft Corp.

The URL accessed on the petition provider's server will cause the petition generator to be invoked in order to generate a petition on behalf of the sender. In one embodiment, the URL can contain all of the necessary information to generate a petition. In yet another embodiment, the URL can contain a subset of the information necessary to generate a petition. By way of a non-limiting example:

```
http://www.petitionprovider.com/generate.pl?sender=City%20
Tribune%20Newspaper&recipient=
steve%40xyzcompany.com&identification=from-
address%40newsletter@citytribunepaper.com
```

In this example, the URL contains petition information as URL-encoded name-value pairs. In an alternative embodiment, the petition information may be passed as data sent using the HTTP POST method. Those skilled in the art will appreciate that the exact method in which the data is passed is of little consequence provided that the minimum data necessary to form the petition is transferred to the petition processor.

Upon invocation, the petition generator can consult the petition rules list to identify special handling of the petition based on the data contained in the petition. The petition rules list includes rules governing whether a petition is to be generated, and if so, how the petition is to be generated. Non-limiting examples of the aspects of petition generation which the rules list governs include the format of the petition and the location of the petition processor. The rules in the petition rules list can make use of information provided to the petition processor by the recipient or by the sender, one or more databases, and/or third party information. The implementation of the petition rules list can vary depending upon the number and complexity of the rules, and can be similar to many other common web-based applications. In one embodiment, the rules may be stored in files located on the systems of the petition provider. In another embodiment, the rules may be stored in a database indexed by petition field values for fast access.

One embodiment of the invention includes a petition rules list which can identify recipients whose petition processors are located on the systems of a remote mail provider, such as a web-based email provider. By way of a non-limiting example:

```
(1) if (Recipient domain is "yahoo.com") then
        redirect http://mail.yahoo.com/whitelist.cgi?$Parameters
        where $Parameters =
            "&recipient=" + url_encode{Recipient} +
            "&sender=" + url_encode{Sender} +
            "&identification=" + url_encode{Identification};
(2) if (Recipient domain is "hotmail.com") then
        redirect http://wl.passport.net/access.dll?$Parameters
        where $Parameters =
            "&recipient=" + url_encode{Recipient} +
            "&sender=" + url_encode{Sender} +
            "&identification=" + url_encode{Identification};
(3) Default:
        send-mime-petition;
```

In this example, rules (1) and (2) specify that email addresses with domains "yahoo.com" and "hotmail.com" are identified as requiring petition generation. Rules (1) and (2) also specify that the petitions for these domains are to be formatted as URL-encoded values ("url_encode") included as parameters in a URL to be returned to the recipient's browser, along with a redirection command ("redirect") to force the recipient's browser to redirect to the URL which, by way of a non-limiting example, can be the location of a remote mail provider's petition processor. Rule (3) specifies that for petition generation requests not satisfying rules (1) or (2), the petition is to be sent to the recipient's browser with an identifying MIME type as described in preceding embodiments. Both rules (1) and (2) specify "redirect" HTTP commands which will be provided to the recipient's browser as part of the petition provider's response.

By way of a non-limiting illustration, if the recipient in the above example had an email address in the domain "hotmail.com", the petition provider could evaluate rule (2) and provide a petition to the recipient's web browser via an HTTP redirect command as follows:

```
http://wl.passport.net/access.dll?&to=johndoe%40hotmail.com&from
=City%20Tribune%20Newspaper&identification=from-
address%20newsletter%40citytribunepaper.com
```

The advantage of the petition provider having the ability to send a petition to a remote mail provider as part of a redirected URL is that for recipients using web-based email providers, it eliminates the need for the installation of software such as the petition processor or email proxy as depicted in FIGS. 4 and 5 respectively, or the need to modify the browser's configuration as depicted in FIG. 6 and accompanying text. This is desirable since modifications of a recipient's system as described in previous embodiments might require the recipient's explicit authorization to perform, which may be seen as a barrier to adoption by web-based email providers.

In order to maintain the integrity of the email access lists, it is important to prevent unauthorized parties (such as senders of unsolicited email wishing to add themselves to an access list) from modifying the recipient's access list. If such a party were to be able to invoke the petition processor, they might be able to modify the recipient's access list, thus negating its effectiveness. In previously described embodiments, such unauthorized invocations of the petition processor could be prevented by the fact that any invocation of a petition processor is initiated on a system in which the recipient explicitly authorized software to be installed or browser configuration changes to be made. Consequently, the petition processor would run either on the recipient's own system, or on the remote mail provider's system, with authorization credentials coming from the installed software or custom browser configuration previously set up on the recipient's system.

Web-based email providers generally employ security measures to prevent unauthorized use of a recipient's email account. Commonly, a password is required to access an account. A cookie or other token containing authorization credentials may also be provided to a web browser in which the recipient has authorized himself with a password initially. This can allow for subsequent access to the account on the same system without requiring password entry. The duration of the cookie's validity is typically determined by the security policies of the web-based email provider and/or user preference. These same security measures may be employed to protect the petition processor from unauthorized invocation. In the presence of a valid cookie with valid authorization credentials, a petition processor can be invoked. In one embodiment, if an attempt is made to invoke the petition processor by a browser not currently authorized to access the account, the petition processor can require that the recipient's password be entered before any access list modification can be made.

By way of a non-limiting example, consider the following petition rule:

```
if (Recipient = "steve@xyzcompany.com") then
    redirect http://mail.yahoo.com/whitelist.cgi?$Parameters
    where $Parameters =
        "recipient=" + url_encode{"xyzcompany@yahoo.com"} +
        "&sender=" + url_encode{$Sender} +
        "&identification=" + url_encode{$Identification};
```

In this example, the rule checks for an individual recipient ("steve@xyzcompany.com"), and if found, generates a petition for a different email address ("xyzcompany@yahoo.com") with the web-based email provider Yahoo! ("http://mail.yahoo.com/whitelist.cgi?$Parameters"). Such an example may arise when recipients have email aliases which mask the identity of their true email provider.

By way of a further non-limiting example, consider the following petition rule:

```
if (Recipient domain is not in licensed domain list) then
    suppress-petition-generation;
```

In this example, the recipient domain is checked against a list of domains who have licensed the ability to use the petition generation technology from the petition provider. In this case, if the mail provider of the recipient is not a licensee of the technology, petition generation will be suppressed, and no petition will be generated.

Referring again to FIG. 7, in another embodiment the sender can request petition generation from the petition provider directly rather than sending code to cause a recipient's browser to request petition generation from the petition provider. Prior to sending the recipient's browser an HTML document, the sender can request petition generation from the petition provider. If the petition provider generates a petition, it is provided to the sender. The sender can then send the petition to the recipient as part of an HTML document and formatted appropriately for the given petition processor. If a petition was not generated, the sender can provide an HTML document to the sender without any petition information. This embodiment has the advantage of allowing the sender to format the HTML document and optimize its layout to take into consideration the presence of a petition and its format.

Figure 8:
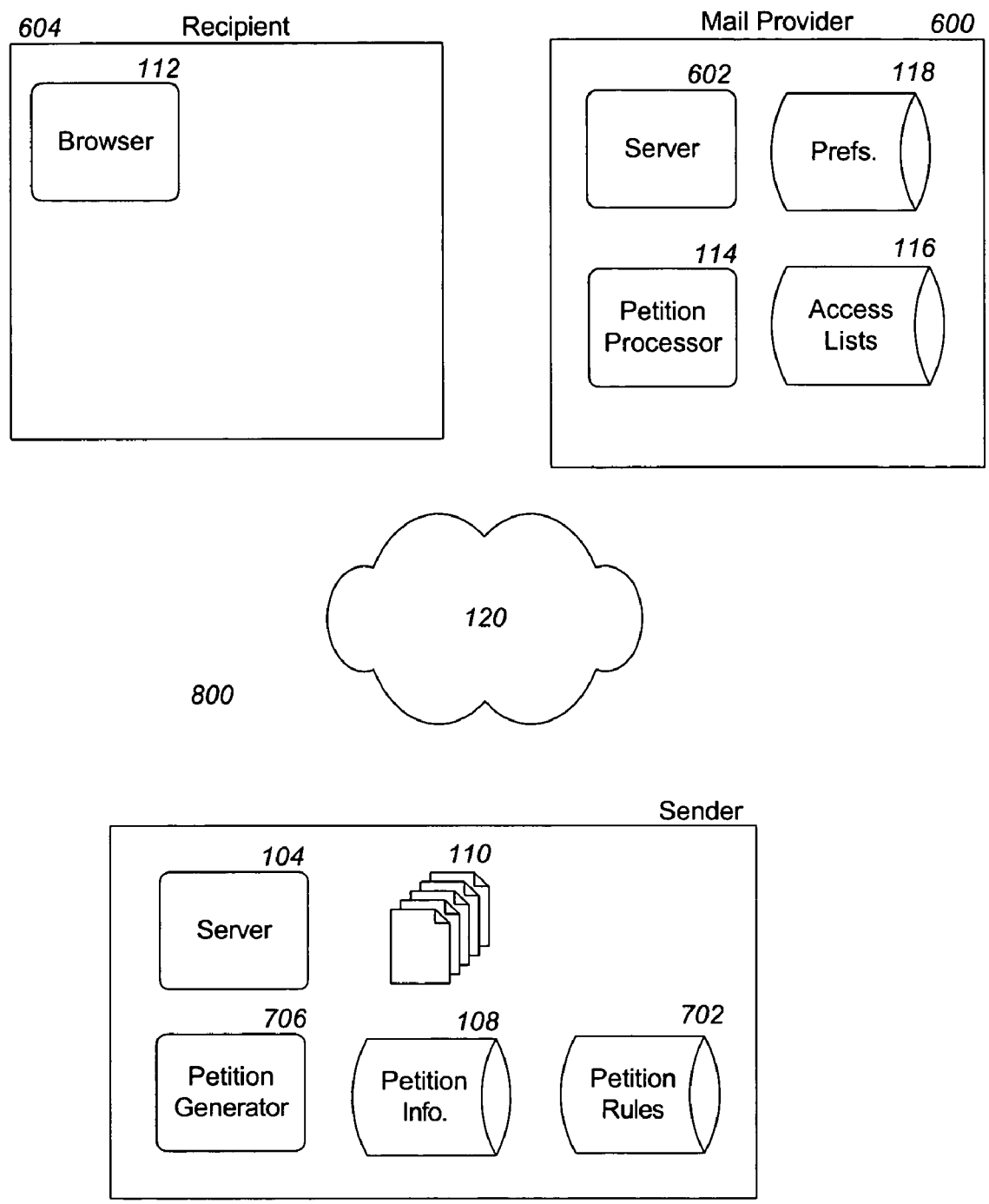
FIG. 8 is a system diagram of an embodiment including petition generation rules.

FIG. 8 is a system diagram of an embodiment including petition generation rules. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks. Sender 800 includes Web/application server 104, petition information 108, web pages 110. In addition, the sender also includes petition generator 706 and petition rules 702. Mail provider 600 includes server 602, petition processor 114, access lists 116, and user preferences information 118. Recipient 604 includes Web browser 112. In this embodiment, the sender requests petition generation from its own petition generator, which can use the petition rules to determine whether to generate a petition and, if so, how to format it. The sender can then provide the petition to the recipient using any of the techniques discussed in the preceding embodiments.

Figure 9:
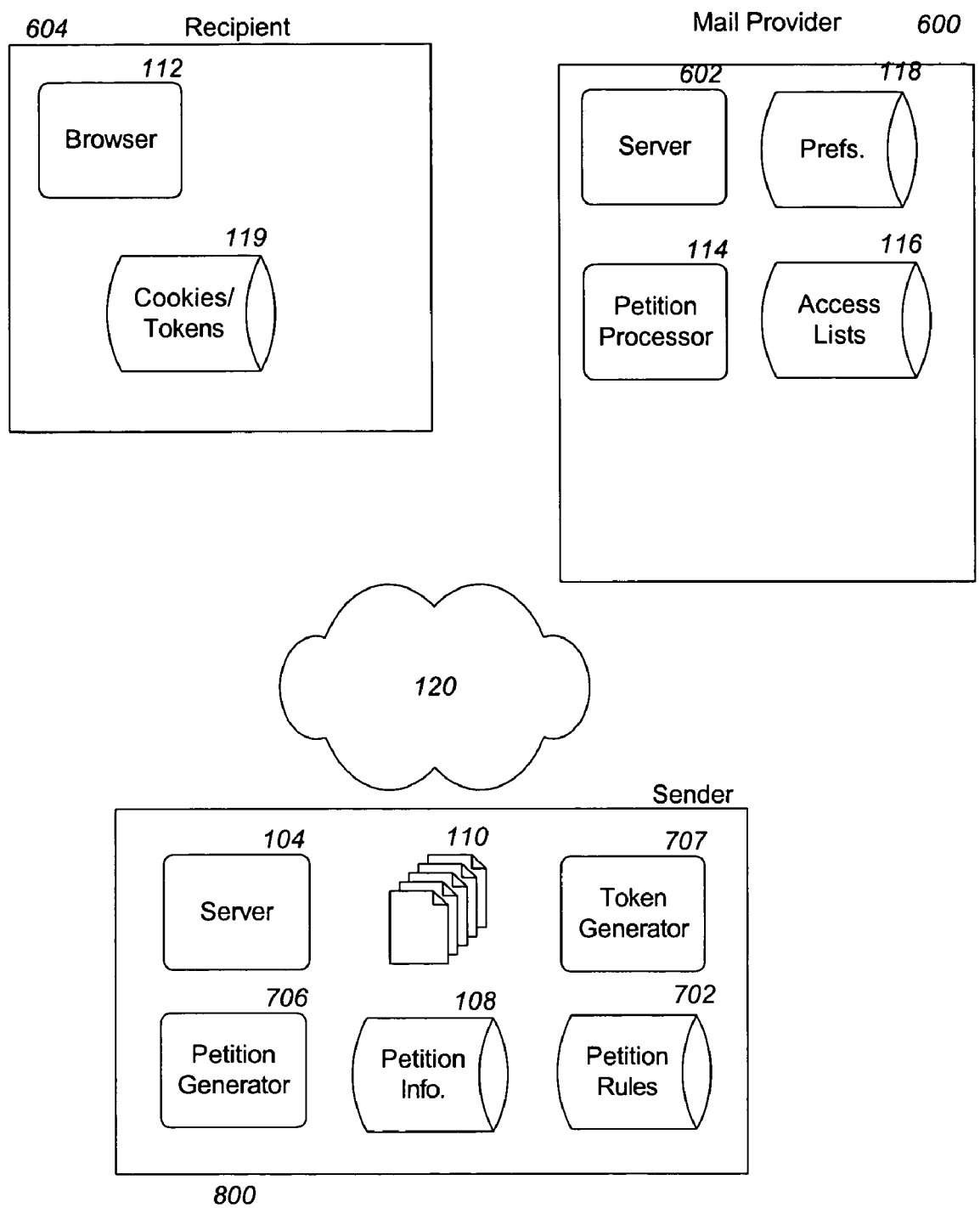
FIG. 9 is a system diagram of an embodiment including token generation.

FIG. 9 is a system diagram of an embodiment including token generation. Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks. Sender 800 includes Web/application server 104, petition information 108, web pages 110. In addition, the sender also includes petition generator 706, token generator 707, and petition rules 702. Mail provider 600 includes server 602, petition processor 114, access lists 116, and user preferences information 118. Recipient 604 includes Web browser 112 and cookies/tokens 119. In this embodiment, the sender requests petition generation from its own petition generator, which can use the petition rules to determine whether to generate a petition and, if so, how to format it.

In this embodiment, the sender is configured to generate a petition and then employs the token generator 707 to store the petition in a token. The sender then transmits the token to recipient 604 which stores the token in the cookies/tokens 119. In an alternate embodiment, the petition generator 706 generates a new web page and stores the petition within the new web page. The token generator 707 then generates a token which includes a reference to the storage location of the petition.

In one embodiment, the token is a cookie. In an alternate embodiment, the token is a file which, with the user's permission is stored in a directory on the user's computer. When the recipient 604 next logs into the mail provider 600, the mail provider checks the cookies/tokens 119 for the presence of a token relating to petitions.

If the mail provider 600 detects the presence of a token relating to petitions, the mail provider 600 retrieves the petition. If the petition is stored within the token, the mail provider 600 retrieves the token from the recipient 604. If the petition is stored remotely, the mail provider 600 follows the reference stored within the token and retrieves the petition from the sender. The petition processor 114 then processes the petition and offers the user a choice as to whether the sender should be added to the whitelist. If so, the petition processor 114 modifies the access lists 116 to indicate that the sender 800 is an approved sender.

In those situations where the token is a cookie, the sender 800 and mail provider 600 may employ several techniques to circumvent the domain restrictions inherent in cookies. In one embodiment, when the recipient 604 subscribes to the mailings offered by the sender 800, the sender 800 requests a cookie from a server located within the domain of the mail provider 600 which provides a cookie which can be read by the server 602 when the user logs in. Alternately, the server 602 may include a frame in its main mail access screen which is located in the domain of the sender 800 and can thus read cookies from the sender's domain. Alternately, the sender 800 may create the cookie directly under its own domain, and the server 602 may include an image or other HTML request in its main mail access screen which is located in the domain of the sender 800, and which causes an HTML web page to be displayed to the recipient 604. The HTML web page may contain a form with an action URL on the server 602, or a link to the server 602 with the petition data embedded, which allows the recipient to transmit the petition data to the mail provider 600. Other mechanisms, including the generation of domain-independent cookies may also be employed.

Figure 10:
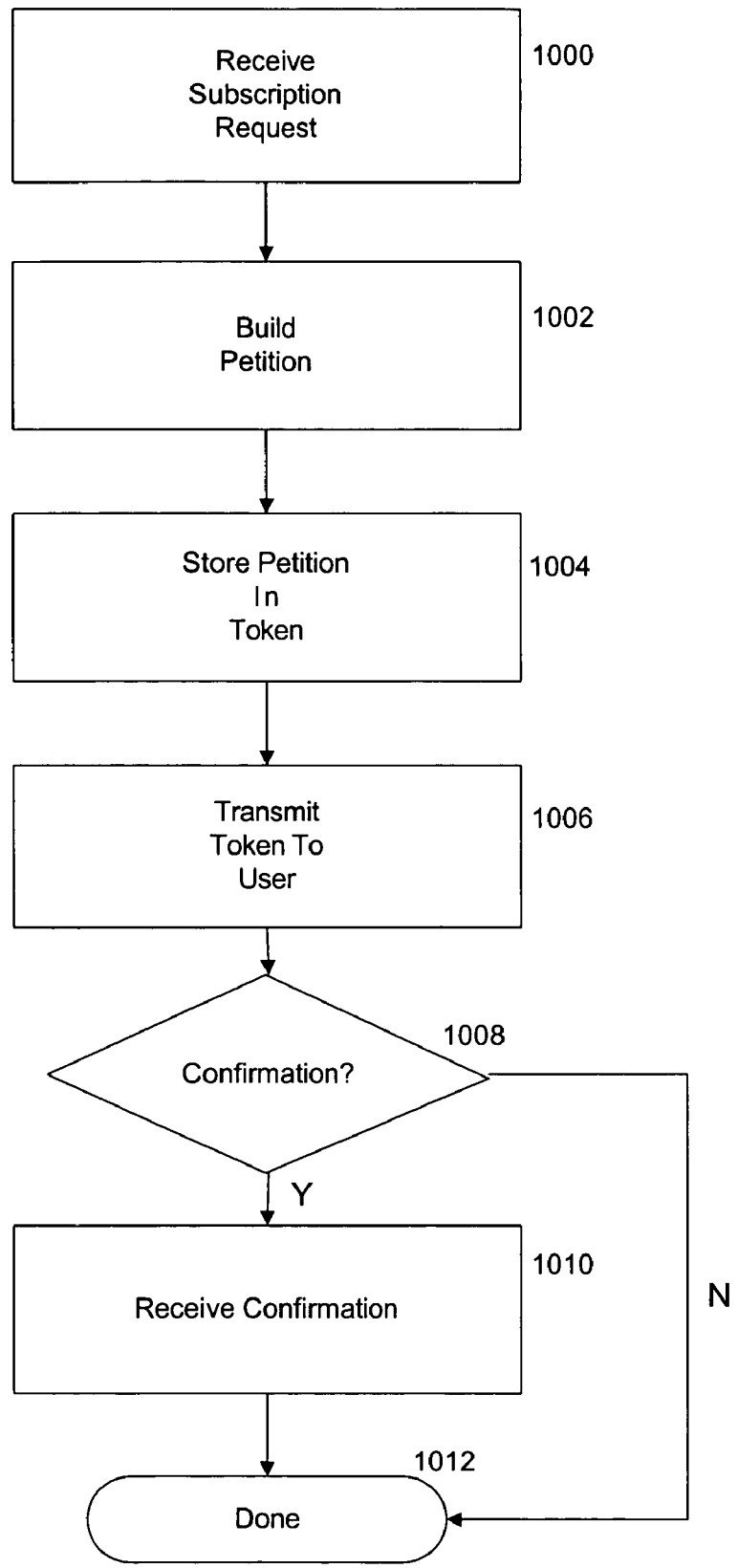
FIG. 10 is a flow chart illustrating petition transmission according to one embodiment.

FIG. 10 is a flow chart illustrating petition transmission according to one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. While in the present embodiment, the process is performed by the sender 800, in alternate embodiments, it can be performed by a third-party petition generation service.

In step 1000, the petition generator receives a subscription request from the recipient 604. The subscription request includes an email address and identification information about the user.

In step 1002, the petition generator uses the recipient's email address in concert with data drawn from the petition information to produce a petition. Petition information can include the sender's descriptive information (e.g., name, description, address, etc.), identification methods and confirmation information. These will be discussed below. The petition information can also keep track of whether or not a particular recipient has added the sender to their whitelist (e.g., whether or not a petition was accepted by a given recipient). In such a case, the sender need not generate a petition. The mechanisms by which petitions are generated are discussed in greater detail with regards to FIG. 2.

In step 1004, the token generator then takes the completed petition and stores the petition in a token. The token may be a cookie, a file which is stored on the user's computer, or some other variant. In step 1006 the server 104 transmits the completed token to the user. If the token is a cookie, the server 104 may redirect the user to an cookie transmission page, which is located in the domain of his email host. For example, Earthlink might make available a page in the domain sender-name.earthlink.net from which the cookie is transmitted. If the cookie is a file, the server 104 might prompt the user to download the file to a directory reserved for petitions.

In step 1008 the sender computer determines whether confirmation from the mail provider is expected. If confirmation is expected, the sender receives confirmation from the mail provider in step 1010. The process finishes in step 1012.

Figure 11:
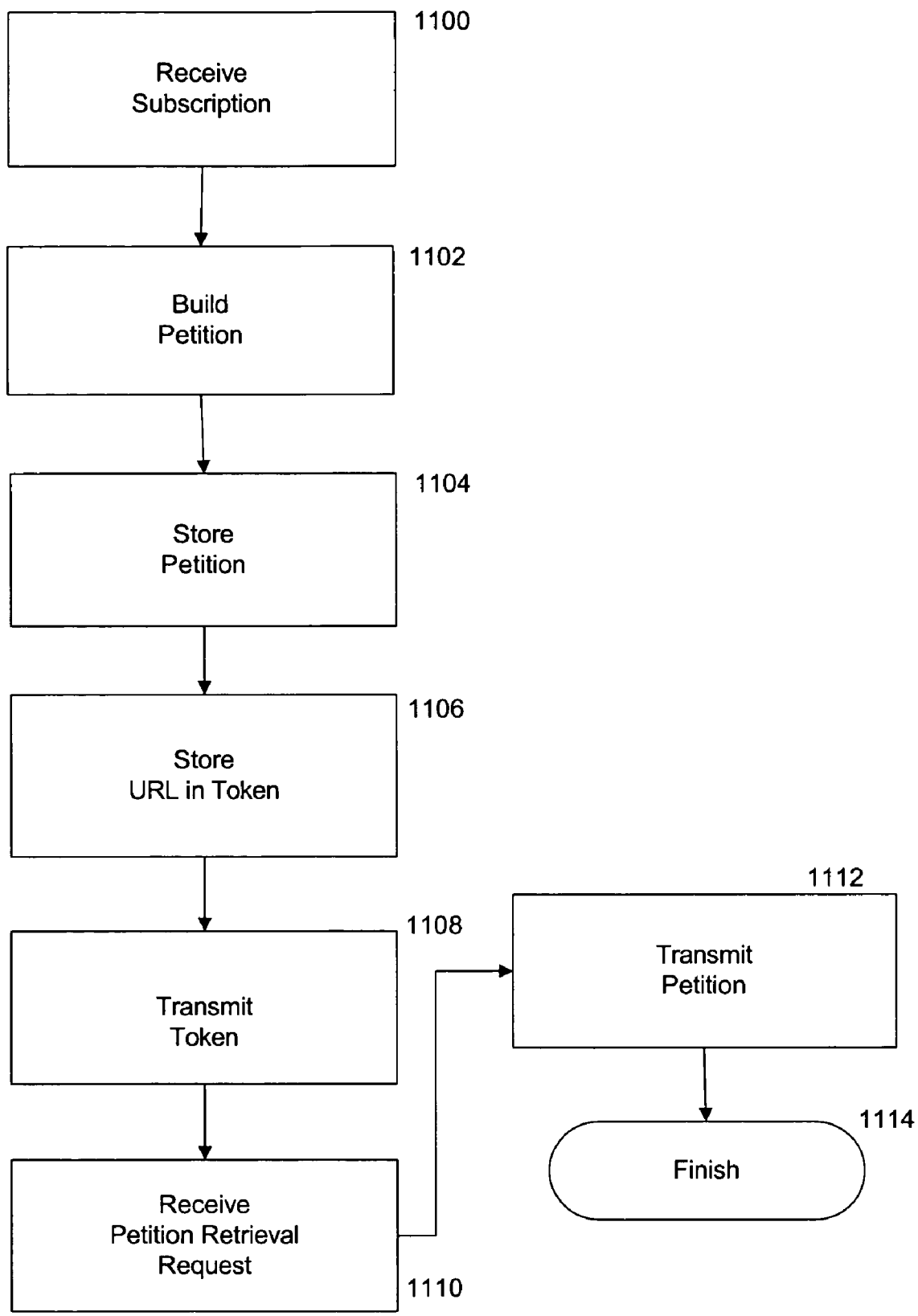
FIG. 11 is a flow chart illustrating petition transmission according to an alternate embodiment.

FIG. 11 is a flow chart illustrating petition transmission according to an alternate embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. While in the present embodiment, the process is performed by the sender 600, in alternate embodiments, it can be performed by a third-party petition generation service.

In step 1102, the petition generator uses the recipient's email address in concert with data drawn from the petition information to produce a petition. Petition information can include the sender's descriptive information (e.g., name, description, address, etc.), identification methods and confirmation information. These will be discussed below. The petition information can also keep track of whether or not a particular recipient has added the sender to their whitelist (e.g., whether or not a petition was accepted by a given recipient). In such a case, the sender need not generate a petition. The mechanisms by which petitions are generated are discussed in greater detail with regards to FIG. 2.

In step 1104, the server stores the petition in a directory previously created for petition storage. This directory is located on a server controlled by the sender, petition generator, or a third party. In step 1106 the server stores the URL for the petition in the token. In one embodiment, the petition is stored securely and the server also stores in the token information such as passwords that are necessary to retrieve the petition.

The token may be a cookie, a file which is stored on the user's computer, or some other variant. In step 1108 the server 104 transmits the completed token to the user. If the token is a cookie, the server 104 may redirect the user to an cookie transmission page, which is located in the domain of their email host. For example, Hotmail might make available a page in the domain sendername.hotmail.com from which the cookie is transmitted. If the cookie is a file, the server 104 might prompt the user to download the file to a directory reserved for petitions.

In step 1110, the server 104 receives a petition retrieval request from the mail provider, which has presumably received a login from the recipient, detected the token, and attempted to retrieve the petition. The petition retrieval request may include authentication information included in the token. In step 1112 the server transmits the petition to the mail provider.

Figure 12:
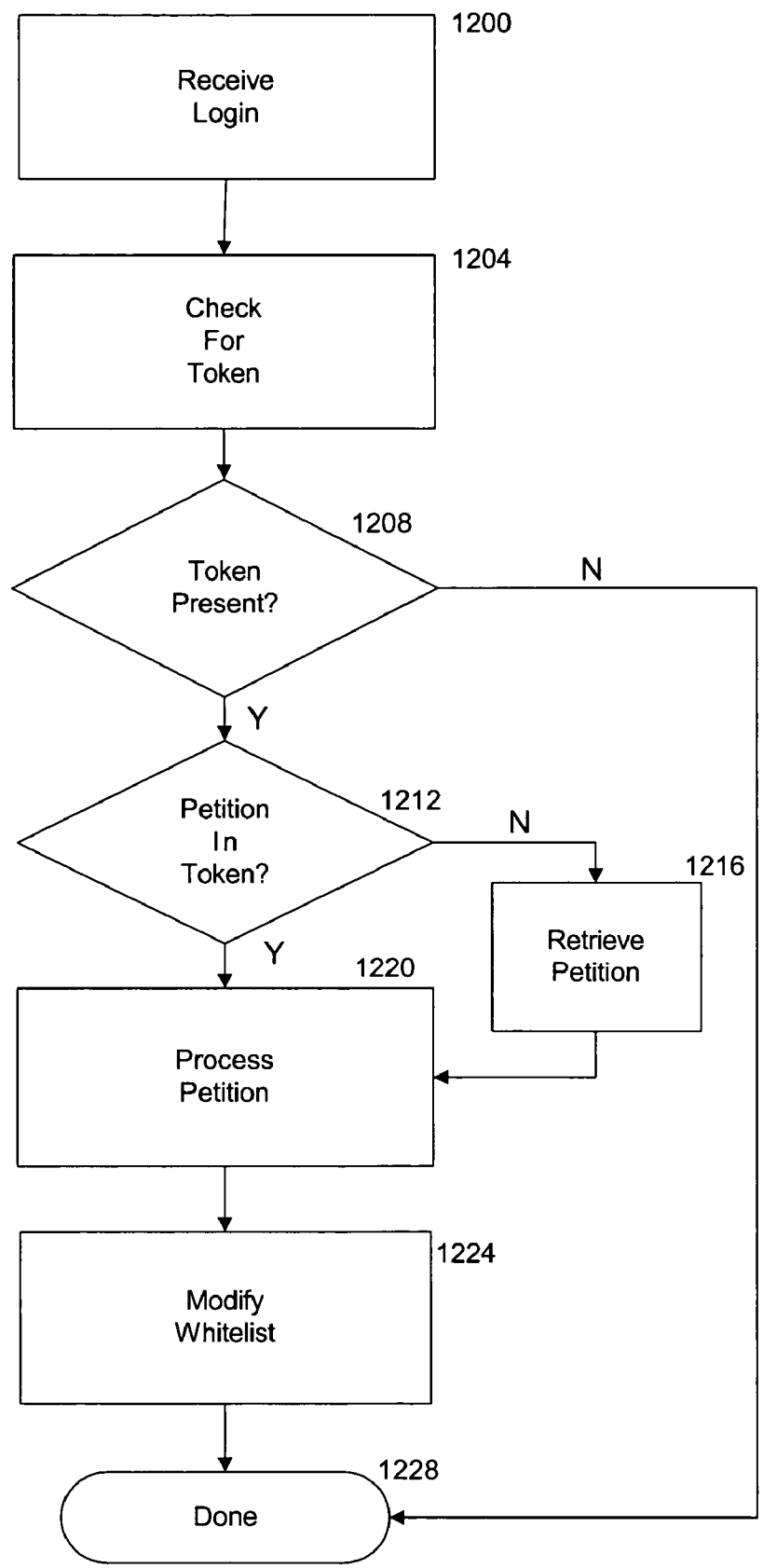
FIG. 12 is a flow chart illustrating petition receipt and processing according to one embodiment of the present invention.

FIG. 12 is a flow chart illustrating petition receipt and processing according to one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. While in the present embodiment, this process is performed by the mail provider 600, in an alternate embodiment it could be performed by a third party authentication or mail management system.

In step 1200, the mail provider 600 receives a login from a user of the mail system. This is preferably achieved by the user navigating to the web page of the mail provide 600 and submitting identification and password information. In step 1204 the mail provider 600 checks for a token in the recipient machine 600. In one embodiment, the mail provider checks the user's cookie folder for cookies relating to whitelist petitions. In an alternate embodiment, the mail provider checks for files in a preselected folder containing tokens having the desired identifying characteristics. If no token is found, the mail provider ends the petition processing process.

If a token is found, the mail provider then moves to step 1212 where it checks the token to determine whether the petition is enclosed within. If a petition is found, the mail provider moves to step 1220. If the token contains a reference to a remotely located petition, the mail provider follows the reference in step 1216 and retrieves the petition.

The mail provider then processes the petition according to pre-existing rules. The processing of petitions is described in greater detail with respect to FIG. 3. In step 1224 the mail provider proceeds to modify the user's whitelist if approved by the user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for modifying mail filters associated with a user of a mail system, the method comprising:
   receiving a subscription request from a recipient to a sender, the subscription request including user information, wherein the subscription request is received as part of a web browser interaction before sending electronic mail between the sender and the recipient and wherein the subscription request is initiated by the recipient;

generating a petition by the sender based on the user information, the petition comprising a request for the sender to be added to a list of approved mail senders, the list associated with the user, wherein inside the petition the sender specifies a set of methods that the sender will use to identify itself in a future time when the sender sends the electronic mail to the recipient;

transmitting a token containing the petition from the sender to the recipient as a result of the subscription request and storing said token at a computing device where the recipient resides, wherein the petition is transmitted during said web browser interaction before sending electronic mail between the sender and the recipient;

receiving a login request from the user to the mail system;

checking for the token containing the petition in the computing device where said recipient resides;

processing said token containing the petition if the token is found on the computing device where the recipient resides and modifying the mail filters associated with the user by adding the sender to the list of approved mail senders as specified in the petition; and transmitting an electronic mail message from the sender to the recipient, wherein the set of methods specified by the sender in the petition are employed by the recipient to verify the sender's identity that transmitted the electronic mail message.

2. The method of claim 1, wherein the token is a cookie.

3. The method of claim 1, wherein the petition specifies an identification method that will be used to verify that an email message is from a given sender.

4. The method of claim 3, wherein the identification method utilizes an origin electronic mail address for the sender.

5. The method of claim 3, wherein the identification method utilizes a digital signature.

6. The method of claim 1, wherein the user information comprises a user identifier.

7. A method for modifying mail filters associated with a user of a mail system, the method comprising:

receiving a subscription request from a recipient to a sender, the subscription request including user information, wherein the subscription request is received as part of a web browser interaction before sending any electronic mail between the sender and the recipient and wherein the subscription request is initiated by the recipient;

generating a petition by the sender based on the user information, the petition comprising a request for the sender to be added to a list of approved mail senders, the list associated with the user, wherein inside the petition the sender specifies a set of methods that the sender will use to identify itself in a future time when the sender sends the electronic mail to the recipient;

transmitting from the sender to a recipient a token storing a reference to a location of the petition as a result of the subscription request and storing the token at a computing device where the recipient resides, wherein the petition is transmitted as part of said web browser interaction before sending any electronic mail;

receiving a login request from the user to the mail system;

searching in the computing device where the recipient resides for the token containing the reference to a location of the petition;

retrieving the petition from said location if the token is found on the computing device where the recipient resides and processing said petition by adding the sender to the list of approved mail senders as specified in the petition; and transmitting an electronic mail message from the sender to the recipient, wherein the set of methods specified by the sender in the petition are employed by the recipient to verify the sender's identity that transmitted the electronic mail message.

8. The method of claim 7, further comprising:

receiving a request for the petition from a party maintaining the list of approved mail senders; and transmitting the petition in response to the request for the petition.

9. The method of claim 7, further comprising:

including authentication credentials in the token; and receiving authentication credentials with the request for the petition.

10. The method of claim 7, wherein the token is a cookie.

11. The method of claim 7, wherein the petition specifies an identification method that will be used to verify that an email message is from a given sender.

12. The method of claim 11, wherein the identification method utilizes an origin electronic mail address for the sender.

13. The method of claim 11, wherein the identification method utilizes a digital signature.

14. The method of claim 7, wherein the user information comprises a user identifier.

15. A computer program product, stored on a computer readable medium, and including computer executable instructions for controlling a processor to modify mail filters, the instructions comprising:

receiving a subscription request from a recipient to a sender, the subscription request including user information, wherein the subscription request is received as part of a web browser interaction before sending any electronic mail between the sender and the recipient and wherein the subscription request is initiated by the recipient;

generating a petition by the sender based on the user information, the petition comprising a request for the sender to be added to a list of approved mail senders, the list associated with the user, wherein inside the petition the sender specifies a set of methods that the sender will use to identify itself in a future time when the sender sends the electronic mail to the recipient;

transmitting a token containing the petition from the sender to the recipient as a result of the subscription request and storing said token at a computing device where the recipient resides, wherein the petition is transmitted as part of said web browser interaction before sending any electronic mail;

receiving a login request from the user to the mail system;

checking for the token containing the petition in the computing device where said recipient resides;

processing said token containing the petition if the token is found on the computing device where the recipient resides and modifying the mail filters associated with the user by adding the sender to the list of approved mail senders as specified in the petition; and transmitting an electronic mail message from the sender to the recipient, wherein the set of methods specified by the sender in the petition are employed by the recipient to verify the sender's identity that transmitted the electronic mail message.

16. The computer program product of claim 15, wherein the token is a cookie.

17. The computer program product of claim 15, wherein the petition specifies an identification method that will be used to verify that an email message is from a given sender.

18. The computer program product of claim 17, wherein the identification method utilizes an origin electronic mail address for the sender.

19. The computer program product of claim 17, wherein the identification method utilizes a digital signature.

20. The computer program product of claim 15, wherein the user information comprises a user identifier.

21. A computer program product, stored on a computer readable medium, and including computer executable instructions for controlling a processor to modify mail filters, the instructions comprising:
receiving a subscription request from a recipient to a sender, the subscription request including user information, wherein the subscription request is received as part of a web browser interaction before sending any electronic mail between the sender and the recipient and wherein the subscription request is initiated by the recipient;
generating a petition by the sender based on the user information, the petition comprising a request for the sender to be added to a list of approved mail senders, the list associated with the user, wherein inside the petition the sender specifies a set of methods that the sender will use to identify itself in a future time when the sender sends the electronic mail to the recipient;
transmitting from the sender to a recipient a token storing a reference to a location of the petition as a result of the subscription request and storing the token at a computing device where the recipient resides, wherein the petition is transmitted as part of said web browser interaction before sending any electronic mail;
receiving a login request from the user to the mail system;
searching in the computing device where the recipient resides for the token containing the reference to a location of the petition;
retrieving the petition from said location if the token is found on the computing device where the recipient resides and processing said petition by adding the sender to the list of approved mail senders as specified in the petition; and
transmitting an electronic mail message from the sender to the recipient, wherein the set of methods specified by the sender in the petition are employed by the recipient to verify the sender's identity that transmitted the electronic mail message.

22. The computer program product of claim 21, wherein the instructions further comprise:
receiving a request for the petition from a party maintaining the list of approved mail senders; and
transmitting the petition in response to the request for the petition.

23. The computer program product of claim 21, wherein the instructions further comprise:
including authentication credentials in the token; and
receiving authentication credentials with the request for the petition.

24. The computer program product of claim 21, wherein the token is a cookie.

25. The computer program product of claim 21, wherein the petition specifies an identification method that will be used to verify that an email message is from a given sender.

26. The computer program product of claim 25, wherein the identification method utilizes an origin electronic mail address for the sender.

27. The computer program product of claim 25, wherein the identification method utilizes a digital signature.

28. The computer program product of claim 21, wherein the user information comprises a user identifier.

29. A system for modifying mail filters, the system comprising:
a server comprising:
a receiving unit receiving a subscription request from a recipient to a sender, the subscription request including user information, wherein the subscription request is received as part of a web browser interaction before sending any electronic mail between the sender and the recipient and wherein the subscription request is initiated by the recipient; and
a transmission unit transmitting a token containing a petition from the sender to a computing device where the recipient resides as a result of the subscription request, the petition comprising a request for the sender to be added to a list of approved mail senders, the list associated with the user wherein the token containing the petition is stored at the computing device where the recipient resides and wherein the petition is transmitted as part of said web browser interaction before sending any electronic mail, wherein inside the petition the sender specifies a set of methods that the sender will use to identify itself in a future time when the sender sends the electronic mail to the recipient;
a petition generator generating the petition from the user information; and
a petition processor processing the petition contained in the token if the token is found on the computing device where the recipient resides by adding the sender to the list of approved mail senders as specified in the petition wherein, at the time of receiving an electronic mail message from the sender to the recipient, the set of methods specified by the sender in the petition are employed by the recipient to verify the sender's identity that transmitted the electronic mail message.

30. The system of claim 29, wherein the token contains the petition.

31. The system of claim 29, wherein the token contains a reference to a location of the petition.

32. The system of claim 29, wherein the petition includes an identification method.

33. The system of claim 29, wherein the identification method utilizes a sender mail address.

34. The system of claim 29, wherein the identification method utilizes a digital signature.

35. The method of claim 1, further comprising:
requesting a confirmation of the success of the petition by the sender; and
transmitting a confirmation of the petition from the recipient to the sender indicating success or denial of the petition.

36. The method of claim 35, wherein the sender assumes that the petition was denied by the recipient if confirmation was requested by the sender but never received from the recipient.

37. The method of claim 1, wherein the token containing the petition is transmitted from the sender to the recipient via hypertext transfer protocol (HTTP).

38. The method of claim 1, further comprising:
maintaining a petition rules list that specify special handling of the petition based on the data contained in the petition such that the petition rule list identifies recipients whose petition processors are located on the systems of a remote mail provider.

39. The method of claim 7, further comprising:
requesting a confirmation of the success of the petition by the sender; and
transmitting a confirmation of the petition from the recipient to the sender indicating success or denial of the petition.

40. The method of claim 39, wherein the sender assumes that the petition was denied by the recipient if confirmation was requested by the sender but never received from the recipient.

41. The method of claim 7, wherein the token containing the reference to the location of the petition is transmitted from the sender to the recipient via hypertext transfer protocol (HTTP).

42. The method of claim 7, further comprising:
maintaining a petition rules list that specify special handling of the petition based on the data contained in the petition such that the petition rule list identifies recipients whose petition processors are located on the systems of a remote mail provider.

43. The method of claim 1, wherein the petition is transmitted to the recipient's web browser and wherein the recipient's web browser provides it to a petition processor.

44. The method of claim 43, wherein the petition processor is configured as a web browser plug-in.

45. The method of claim 1, wherein the petition, once processed by the recipient, causes the electronic mail message generated by an automated mail program of the sender to bypass the recipient's email filters.

* * * * *

UNITED STATES PATENT AND TRADEMARK OFFICE
CERTIFICATE OF CORRECTION

PATENT NO. : 7,660,857 B2  Page 1 of 1
APPLICATION NO. : 10/721044
DATED : February 9, 2010
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this

Thirtieth Day of November, 2010

David J. Kappos
*Director of the United States Patent and Trademark Office*